United States Patent
Lo et al.

(10) Patent No.: US 10,111,184 B2
(45) Date of Patent: Oct. 23, 2018

(54) METHOD FOR REDUCING NUMBER OF TIMES OF SWITCHING COMMUNICATION CHANNELS AND MOBILE DEVICE USING THE SAME

(71) Applicant: ASUSTeK COMPUTER INC., Taipei (TW)

(72) Inventors: Wei-Cheng Lo, Taipei (TW); Chia-Hao Chang, Taipei (TW); Kuo-Chu Liao, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 752 days.

(21) Appl. No.: 14/645,397

(22) Filed: Mar. 11, 2015

(65) Prior Publication Data

US 2015/0271767 A1  Sep. 24, 2015

Related U.S. Application Data

(60) Provisional application No. 61/954,614, filed on Mar. 18, 2014.

(30) Foreign Application Priority Data

Jan. 16, 2015  (TW) .............................. 104101489 A

(51) Int. Cl.
*H04W 52/30* (2009.01)
*H04W 52/12* (2009.01)
(Continued)

(52) U.S. Cl.
CPC ........... *H04W 52/30* (2013.01); *H04W 52/12* (2013.01); *H04W 52/28* (2013.01); *H04W 36/32* (2013.01);
(Continued)

(58) Field of Classification Search
CPC ............................... H04W 36/32; Y02B 60/50
See application file for complete search history.

(56) References Cited

U.S. PATENT DOCUMENTS

2004/0180659 A1  9/2004  Pedraza et al.
2006/0019665 A1*  1/2006  Aghvami .............. H04W 16/32
455/444

(Continued)

FOREIGN PATENT DOCUMENTS

| CN | 101277490 | 10/2008 |
| CN | 101951671 | 1/2011 |
| CN | 101959297 | 1/2011 |

*Primary Examiner* — Mandish Randhawa
(74) *Attorney, Agent, or Firm* — JCIPRNET

(57) ABSTRACT

A method for reducing the number of the times of switching communication channels and a mobile device are provided. The method includes following steps: determining whether the mobile device is at a stationary state or a semi-stationary state according to a plurality of location information of the mobile device during a predetermined time interval; recognizing an area where the mobile device is located and a communication mode of the mobile device when the mobile device is at the stationary state or the semi-stationary state; establishing a transmission power variation table according to a plurality of transmission powers used by the mobile device at the communication mode; searching for a specific transmission power which is most frequently used from the transmission power variation table; increasing a lowest allowable transmission power of the mobile device to a target transmission power higher than the specific transmission power; and recording the target transmission power.

7 Claims, 3 Drawing Sheets

(51) Int. Cl.
*H04W 52/28* (2009.01)
*H04W 52/36* (2009.01)
*H04W 36/32* (2009.01)

(52) U.S. Cl.
CPC ........ *H04W 52/283* (2013.01); *H04W 52/287* (2013.01); *H04W 52/367* (2013.01)

(56) References Cited

U.S. PATENT DOCUMENTS

| | | | |
|---|---|---|---|
| 2012/0021800 A1* | 1/2012 | Wilson | H04W 52/146 455/550.1 |
| 2012/0220302 A1 | 8/2012 | Ebara et al. | |
| 2012/0252521 A1 | 10/2012 | Nagaraja et al. | |
| 2013/0116001 A1 | 5/2013 | Wang | |

* cited by examiner

METHOD FOR REDUCING NUMBER OF TIMES OF SWITCHING COMMUNICATION CHANNELS AND MOBILE DEVICE USING THE SAME

CROSS-REFERENCE TO RELATED APPLICATION

This application claims the priority benefits of U.S. provisional application Ser. No. 61/954,614, filed on Mar. 18, 2014, and Taiwan application serial No. 104101489, filed on Jan. 16, 2015. The entirety of each of the above-mentioned patent applications is hereby incorporated by references herein and made a part of specification.

BACKGROUND OF THE INVENTION

Field of the Invention

The invention relates to a method for reducing the number of the times of switching communication channels and a mobile device using the same.

Description of the Related Art

The communication quality of a wireless communication device changes greatly due to self-jamming, external interference, a current channel state (such as path loss, shadowing, multipath or fading) and an antenna radiation pattern, and thus the base station adjusts power in different degrees or switches the communication channels of the wireless communication device instantly, so as to maintain a normal quality of service (QoS).

When the transmission power of the wireless communication device is too low, the base station determines poor signal quality of the wireless communication device, and the base station requires the wireless communication device to switch the communication channel (which means a handover). However, the transmission power is increased greatly when the handover operation is executed, the power consumption of the wireless communication device increases due to the handover operation under the requirement of the base station.

BRIEF SUMMARY OF THE INVENTION

A method for reducing the number of the times of switching the communication channels and a mobile device using the same are provided, and a lowest allowable transmission power of the mobile device is increased to reduce the number of handover operations.

A method for reducing the number of the times of switching the communication channels adapted to a mobile device is provided. The method includes following steps: determining whether the mobile device is at a stationary state or a semi-stationary state according to a plurality of location information of the mobile device during a predetermined time interval; recognizing an area where the mobile device is located and a communication mode of the mobile device when the mobile device is at the stationary state or the semi-stationary state; establishing a transmission power variation table according to a plurality of transmission powers used by the mobile device at the communication mode, wherein the transmission power variation table corresponds to the area and the communication mode, and the transmission power variation table records the number of the mobile device using the transmission powers; searching for a specific transmission power which is most frequently used from the transmission power variation table; increasing a lowest allowable transmission power of the mobile device to a target transmission power higher than the specific transmission power; and recording the target transmission power.

A mobile device includes a transceiver, a storage unit and a processing unit. The storage unit stores a plurality of modules. The processing unit is connected to the transceiver and the storage unit, accesses and executes the modules. The modules include a determination module, a recognition module, an establishing module, a search module, an increasing module and a recording module. The determination module determines whether the mobile device is at a stationary state or a semi-stationary state according to a plurality of location information of the mobile device during a predetermined time interval. The recognition module recognizes an area where the mobile device is located and a communication mode of the mobile device when the mobile device is at the stationary state or the semi-stationary state. The establishing module establishes a transmission power variation table according to a plurality of the transmission powers used by the mobile device at the communication mode. The transmission power variation table corresponds to the area and the communication mode. The transmission power variation table records the number of the mobile device using the transmission powers. The search module searches for a specific transmission power which is most frequently used from the transmission power variation table. The increasing module increases a target transmission power higher than the specific transmission power. The recording module records the target transmission power.

These and other features, aspects and advantages of the present invention will become better understood with regard to the following description, appended claims, and accompanying drawings.

DETAILED DESCRIPTION OF THE EMBODIMENTS

Figure 1:
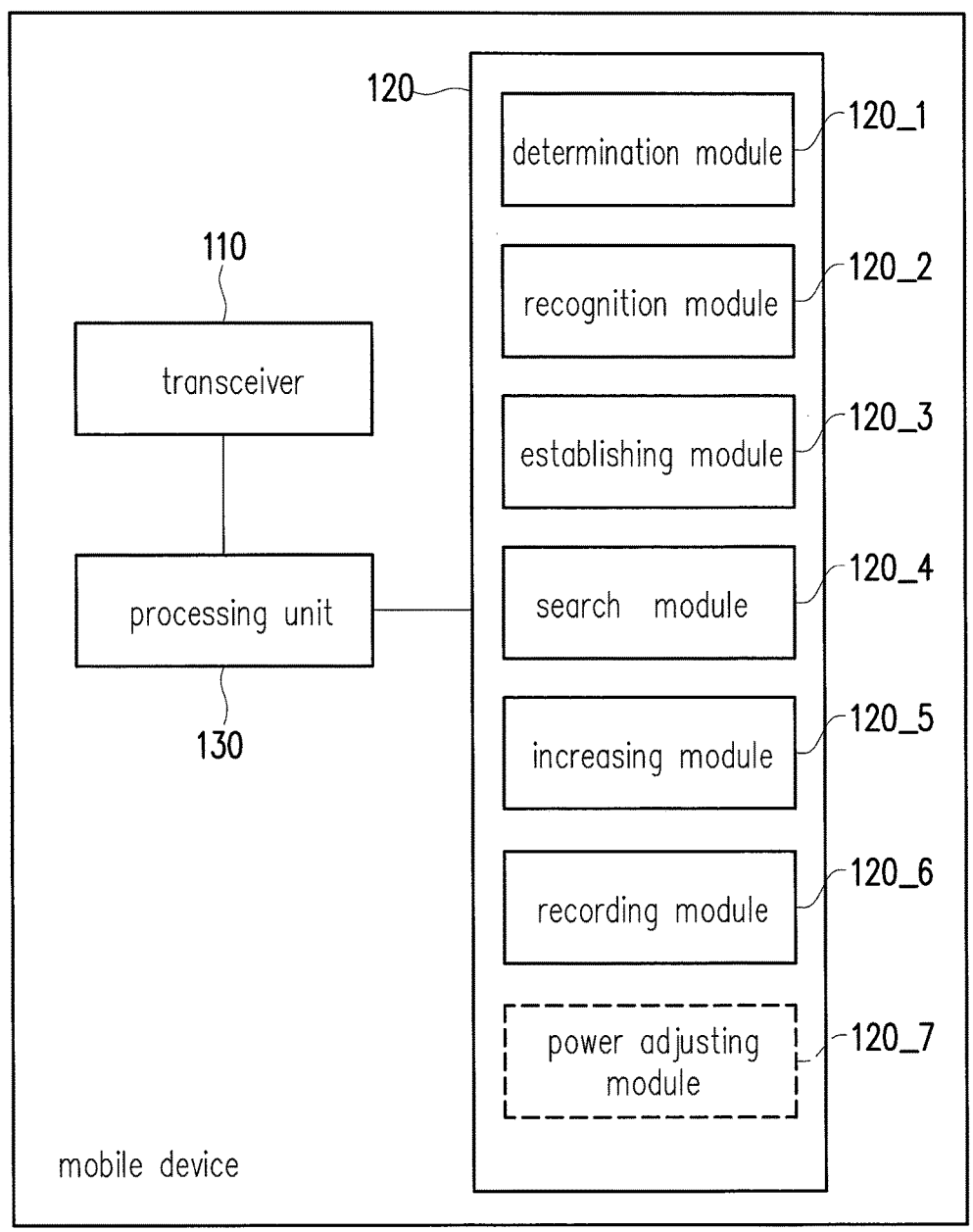
FIG. 1 is a schematic diagram showing a mobile device in an embodiment.

FIG. 1 is a schematic diagram showing a mobile device in an embodiment. In the embodiment, the mobile device 100 includes a transceiver 110, a storage unit 120 and a processing unit 130. The mobile device 100 is a smart phone, a tablet computer or a personal digital assistant (PDA).

The transceiver 110 is a component of a communication protocol unit. The transceiver 110 supports a global system for mobile communication (GSM), a personal handy-phone system (PHS), a code division multiple access (CDMA) system, a fourth generation long term evolution (4G LTE) system, a wireless fidelity (Wi-Fi) system or a worldwide interoperability for microwave access (WiMAX) transmission, which is not limited herein.

The transceiver 110 includes at least a transmitter circuit, a receiver circuit, an analog-to-digital (A/D) convertor, a digital-to-analog (D/A) convertor, a low noise amplifier (LNA), a mixer, a filter, a matching circuit, a transmission line, a power amplifier (PA), one or more antenna units and a local storage medium, and the transceiver 110 provides the wireless access for the mobile device 100 in FIG. 1. The receiver circuit executes low noise amplifying, impedance matching, frequency mixing, downlink frequency conversion, filtering and amplifying. The transmitter circuit executes amplifying, impedance matching, frequency mixing, uplink frequency conversion, filtering and power amplifying. The A/D convertor converts the analog signals to the digital signals, and the D/A convertor converts the digital signals to the analog signals.

The storage unit 120 is a memory, a hard disk or other storage components, and the storage unit 120 records multiple modules. The processing unit 130 is one or a combination of a central processing unit (CPU), a programmable micro-processor, a digital signal processor (DSP), a programmable controller, an application specific integrated circuit (ASIC) and a programmable logic device (PLD).

In the embodiment, the processing unit 130 accesses and executes a determination module 120_1, a recognition module 120_2, an establishing module 120_3, a search module 120_4, an increasing module 120_5 and a recording module 120_6 of the storage unit 120 to realize the steps of a method for reducing the number of the times of switching the communication channels.

Figure 2:
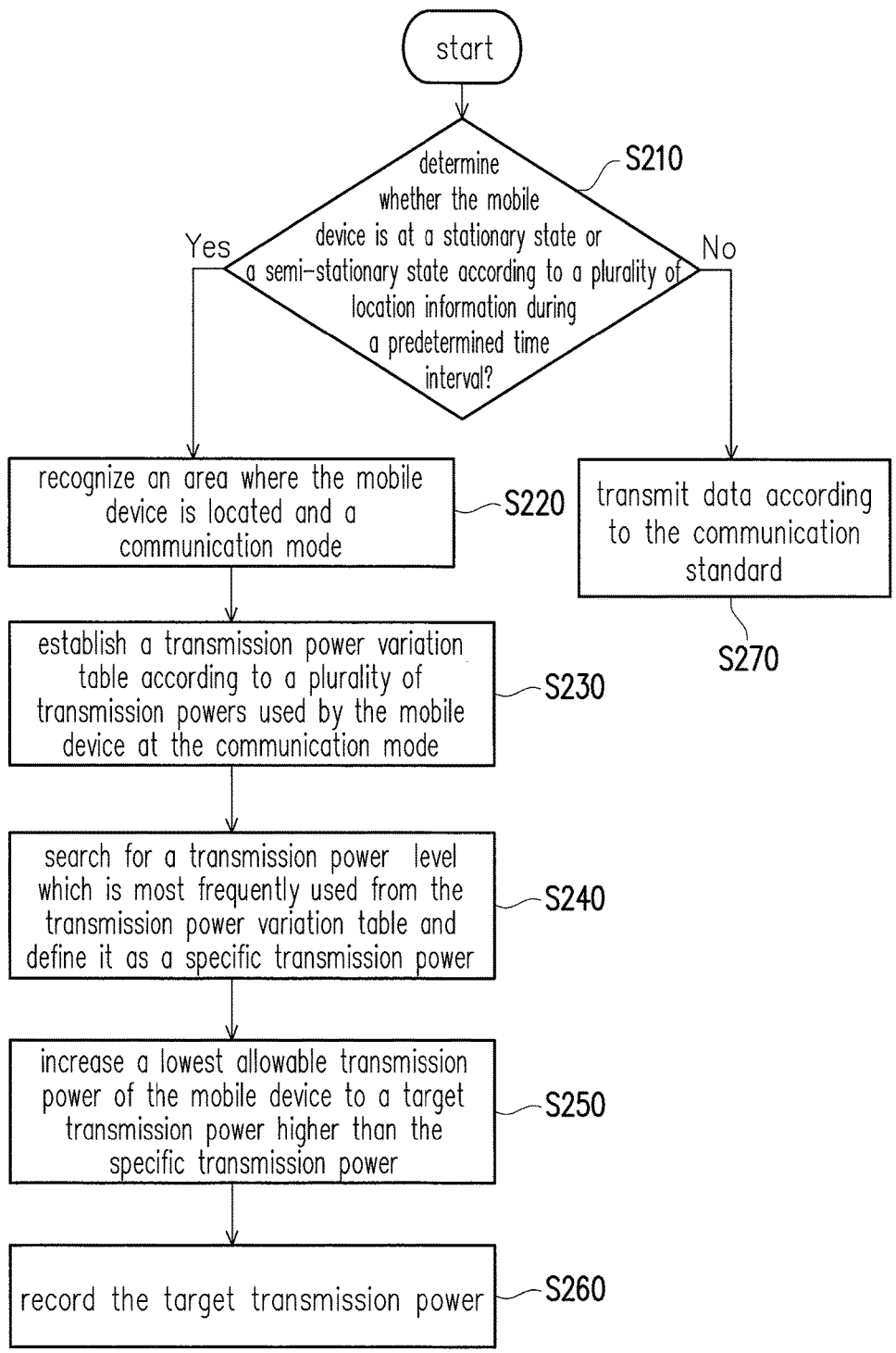
FIG. 2 is a flow chart showing a method for reducing the number of the times of switching the communication channels in an embodiment.

FIG. 2 is a flow chart showing a method for reducing the number of the times of switching communication channels in an embodiment. The method is executed by the mobile device 100 in FIG. 1, and the steps of the method are illustrated with the components in FIG. 1 hereinafter.

In step S210, the determination module 120_1 determines whether the mobile device 100 is at a stationary state or a semi-stationary state according to a plurality of location information of the mobile device 100 during a predetermined time interval.

In an embodiment, the predetermined time interval is a time interval of a few microseconds or a few seconds, and the determination module 120_1 obtains the location information (such as the coordinate) of the mobile device 100 via an assisted global positioning system (A-GPS), a GPS, a media access control (MAC) address or a cell identification (cell ID). Then, the determination module 120_1 calculates a moving speed of the mobile device 100 based on the change of the coordinate of the mobile device 100 during the predetermined time interval, and the determination module 120_1 determines whether the mobile device 100 is at the stationary state or the semi-stationary state according to the moving speed.

The definitions of the stationary state and the semi-stationary state are different according to a communication standard used by the mobile device 100. In an embodiment, the mobile device 100 uses a high speed download packet access (HSDPA) protocol of the third generation partnership project (3GPP), and the determination module 120_1 determines whether the mobile device 100 is at the stationary state, the semi-stationary state or a mobility state. The stationary state is a state that the mobile device 100 stays still, the semi-stationary state is a state that the mobile device 100 is moving at a low speed (such as a walking speed of human beings), and the mobility state is a state that the mobile device 100 is moving at a high speed (such as a speed of a vehicle), which is not limited herein.

When the mobile device 100 is not at the stationary state or the semi-stationary state, in step S270, the processing unit 130 transmits data according to the communication standard.

On the other hand, when the mobile device 100 is at the stationary state or the semi-stationary state, in step S220, the recognition module 120_2 recognizes the area where the mobile device 100 is located and the communication mode of the mobile device 100. In an embodiment, the recognition module 120_2 recognizes the area according to the coordinate of the mobile device 100. The area includes home, a company or an office. The communication mode is a data transmission mode, a voice call mode or a standby mode defined by the communication standard used by the mobile device 100. The communication standard is a second generation (2G), third generation (3G) or fourth generation (4G) mobile communication system standard, which is not limited herein.

In step S230, the establishing module 120_3 establishes a transmission power variation table according to the transmission powers used by the mobile device 100 at the communication mode. In an embodiment, the establishing module 120_3 obtains a plurality of transmission power levels (which are called TXLEV for short hereinafter) defined by the communication standard and initializes a count value (such as 0) corresponding to the transmission power levels. When the mobile device 100 uses a first transmission power of the transmission powers, the establishing module 120_3 searches for a first transmission power level corresponding to the first transmission power from the transmission power levels, and accumulates the count value (which represents the number of the mobile device 100 using the first transmission power) corresponding to the first transmission power level TXLEV. The power level is represented by a median of a power value range.

TABLE 1

| transmission power level (TXLEV) | count value |
|---|---|
| 0 | 367 |
| 1 | 747 |
| 2 | 911 |
| 3 | 934 |
| 4 | 425 |
| 5 | 62 |
| 6 | 9 |
| 7 | 2 |
| 8 | 15 |
| 9 | 190 |
| 10 | 2209 |
| 11 | 1368 |
| 12 | 8 |
| 13 | 0 |
| 14 | 0 |
| 15 | 0 |

In TABLE 1, the communication standard is a 2G mobile communication system standard, and the establishing module 120_3 establishes the transmission power variation table according to the transmission powers used by the mobile device 100 at the communication mode. Taking the high band (DCS1800/PCS1900) of the 2G mobile communication system standard as an example, 16 transmission power levels (TXLEV 0 to TXLEV 15) are defined. Thus, the establishing module 120_3 establishes columns corresponding to the 16 transmission power levels and initializes the count values of the transmission power levels to 0. When the mobile device 100 uses the first transmission power corresponding to a transmission power level, the establishing module 120_3 accumulates the count value (which means the number of the mobile device 100 using the first transmission power) of the transmission power level. Consequently, the number of the mobile device 100 using the transmission power corresponding to each of the transmission power levels can be found in TABLE 1. In an embodiment, the number of the mobile device 100 using the transmission power corresponding to TXLEV 0 is 367, and the number of the mobile device 100 using the transmission power corresponding to TXLEV 1 is 747.

Since the power is transmitted under the 2G mobile communication system standard, the transmission power levels are shown in TABLE 1. Each of the transmission power levels includes a power range, and each of the power ranges is 2 dB according to the 3GPP specification and is represented by a median. The higher the transmission power level is, the lower the transmission power is, and vice versa. Thus, the transmission power corresponding to TXLEV 0 is the highest, and the transmission power corresponding to TXLEV 15 is the lowest. In an embodiment, the transmission power is continuous according to the 3G mobile communication system standard, and an interval between two powers is 1 dB. Consequently, a count value corresponds to one transmission power value in the transmission power variation table, which is not limited herein.

As shown in TABLE 1, the count values corresponding to TXLEV 10 and TXLEV 11 are larger than those of other transmission power levels. It means that the mobile device 100 uses the lower transmission powers more frequently, and thus the mobile device 100 is required by the base station to switch the communication channels (which means the handover operation) frequently. At the state, the power consumption of the mobile device 100 is greatly increased due to the frequent handover operations. However, after the steps S240 to S260 shown in FIG. 2 are executed, the number of the handover operations of the mobile device 100 is effectively reduced, and the power consumption of the mobile device 100 is reduced. The details are illustrated hereinafter.

In step S240, the search module 120_4 searches for a transmission power level which has the largest count value from the transmission power variation table and defines the transmission power level as a specific transmission power. Please refer to TABLE 1, the transmission power level which is most frequently used is the transmission power corresponding to TXLEV 10.

Then, in step S250, the increasing module 120_5 increases a lowest allowable transmission power of the mobile device 100 to a target transmission power which is higher than the specific transmission power. In step S260, the recording module 1206 records the target transmission power. The lowest allowable transmission power represents a lower limit of the transmission power of the mobile device 100, which means that the transmission power of the mobile device 100 is not lower than the lowest allowable transmission power.

Please refer to TABLE 1, the increasing module 120_5 searches for the specific transmission power level (which is TXLEV 10) corresponding to the specific transmission power. Then, the increasing module 120_5 sets a transmission power which is higher than TXLEV 10 as the target transmission power, and sets the target transmission power.

In an embodiment, the increasing module 120_5 selects TXLEV 9 (which is higher than TXLEV 10 by one lever) as the target transmission power, and the increasing module 120_5 sets the lowest allowable transmission power to the transmission power corresponding to TXLEV 9. In another embodiment, the increasing module 120_5 selects TXLEV 8 (which is higher than TXLEV 10 by two levels) as the target transmission power, and the increasing module 120_5 sets the lowest allowable transmission power to the transmission power corresponding to TXLEV 8. Persons with ordinary skills in the art should know that the predetermined power levels in embodiments are not used to limit the scope of the invention.

After the increasing module 120_5 increases the lowest allowable transmission power to the target transmission power, since the mobile device 100 does not use the low transmission power, the base station does not require the mobile device 100 to execute the handover operations too frequently. Consequently, the number of the handover operations of the mobile device 100 is reduced, and thus the power consumption of the mobile device 100 is reduced.

In an embodiment, the storage unit 120 further includes a power adjusting module 120_7. The power adjusting module 120_7 sets the current lowest allowable transmission power of the mobile device 100 to the target transmission power when the mobile device 100 uses the communication mode in the area next time. Thus, when the mobile device 100 uses the communication standard and the communication mode in the area again, the power consumption of the mobile device 100 is reduced.

An embodiment is provided to illustrate the method hereinafter.

TABLE 2

| transmission power level (TXLEV) | count value |
| --- | --- |
| 0 | 5 |
| 1 | 0 |
| 2 | 1 |
| 3 | 7 |
| 4 | 26 |
| 5 | 276 |
| 6 | 969 |
| 7 | 2526 |
| 8 | 3396 |
| 9 | 0 |
| 10 | 0 |
| 11 | 0 |
| 12 | 0 |
| 13 | 0 |
| 14 | 0 |
| 15 | 0 |

TABLE 2 is a transmission power variation table when the mobile device 100 uses the transmission power corresponding to TXLEV 8 as the lowest allowable transmission power. The environment in establishing TABLE 2 is the same as that of the TABLE 1 (which means the same area, the same communication standard and the same communication mode).

As shown in TABLE 2, the count values (which are 0) of TXLEV 10 and TXLEV 11 are smaller than the count values (which are 2209 and 1368) of TXLEV 10 and TXLEV 11 shown in TABLE 1. That means, after the mobile device 100 uses the transmission power corresponding to TXLEV 8 as the lowest allowable transmission power, the possibility that the transmission power of the mobile device 100 decreases to TXLEV 10 or TXLEV 11 is zero. In other words, the number of the handover operations shown in TABLE 2 is smaller than that in TABLE 1, and the power consumption is reduced. The difference between TABLE 1 and TABLE 2 is illustrated with FIG. 3 hereinafter.

Figure 3:
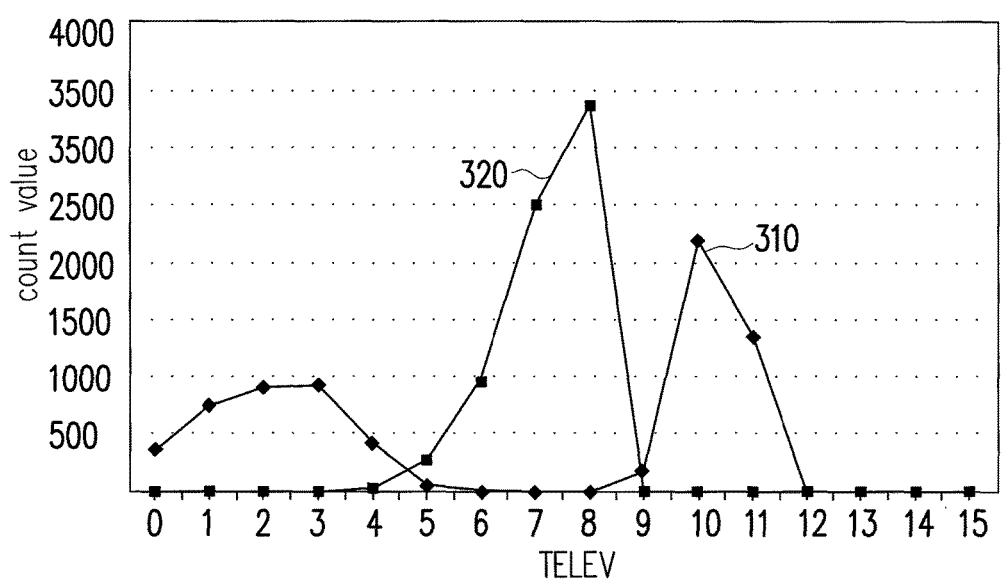
FIG. 3 is a tendency chart according to TABLE 1 and table 2.

FIG. 3 is a tendency chart according to TABLE 1 and TABLE 2. In the embodiment, the horizontal axis represents TXLEV, and the vertical axis represents the count value. The curves 310 and 320 are drawn according to TABLE 1 and TABLE 2. As shown in FIG. 3, the curve 320 is located at the left of the curve 310. That means, the number of the handover operations corresponding to the curve 320 is smaller than that corresponding to the curve 310.

In other embodiments, since the environment in the area changes as time goes by (for example, a new base station appears or an old base station is eliminated), when the mobile device 100 uses the target transmission power for predetermined period (such several weeks or months), the determination module 120_1, the recognition module 120_2, the establishing module 120_3, the search module 120_4, the increasing module 120_5 and the recording module 120_6 executes the steps S210 to S260 to obtain a new target transmission power.

In sum, after the lowest allowable transmission power of the mobile device is increased to the target transmission power, since the mobile device does not use the low transmission power, the base station does not require the mobile device to execute the handover operations too frequently. Consequently, the number of the handover operations of the mobile device is reduced, and thus the power consumption of the mobile device is reduced.

After the mobile device finds out the target transmission power corresponding to an area, a communication standard and a communication mode based on the method, the mobile device directly uses the target transmission power as the lowest allowable transmission power from now on, and the method is not to be repeatedly executed.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A method for reducing the number of times of switching communication channels adapted to a mobile device, comprising following steps:
    determining whether the mobile device is at a stationary state or a semi-stationary state according to a plurality of location information of the mobile device during a predetermined time interval;
    recognizing an area where the mobile device is located and a communication mode of the mobile device when the mobile device is at the stationary state or the semi-stationary state;
    establishing a transmission power variation table according to a plurality of transmission powers used by the mobile device at the communication mode, wherein the transmission power variation table corresponds to the area and the communication mode, and the transmission power variation table records a plurality of numbers, each of numbers corresponds to times of each of the plurality of transmission powers used by the mobile device;
    searching for a specific transmission power which is most frequently used from the transmission power variation table;
    increasing a lowest allowable transmission power of the mobile device to a target transmission power higher than the specific transmission power; and
    recording the target transmission power;
    taking the target transmission power as a current lowest allowable transmission power to transmit when the mobile device uses the communication mode in the area again.

2. The method according to claim 1, wherein the communication mode includes a data transmission mode, a voice call mode or a standby mode corresponding to a communication standard.

3. The method according to claim 2, wherein the step of establishing the transmission power variation table according to a plurality of the transmission powers used by the mobile device at the communication mode includes:
    obtaining the transmission powers defined by the communication standard;
    initializing a count value corresponding to each of the transmission powers; and
    accumulating the count value of a first transmission power when the mobile device uses the first transmission power of the transmission powers.

4. The method according to claim 1, wherein after the step of recording the target transmission power, the method further includes:
    backing to the step of determining whether the mobile device is at the stationary state or the semi-stationary state according to the location information of the mobile device when the mobile device uses the target transmission power for a predetermined period.

5. A mobile device, comprising:
    a transceiver;
    a storage unit storing a plurality of modules; and
    a processing unit connected to the transceiver and the storage unit, accessing and executing the modules, wherein the modules include:
    a determination module determining whether the mobile device is at a stationary state or a semi-stationary state according to a plurality of location information of the mobile device during a predetermined time interval;
    a recognition module recognizing an area where the mobile device is located and a communication mode of the mobile device when the mobile device is at the stationary state or the semi-stationary state;
    an establishing module establishing a transmission power variation table according to a plurality of the transmission powers used by the mobile device at the communication mode, wherein the transmission power variation table corresponds to the area and the communication mode, and the transmission power variation table records a plurality of numbers, each of numbers corresponds to times of each of the plurality of transmission powers used by the mobile device;
    a search module searching for a specific transmission power which is most frequently used from the transmission power variation table;
    an increasing module increasing a lowest allowable transmission power of the mobile device to a target transmission power which is higher than the specific transmission power; and
    a recording module recording the target transmission power;
    a power adjusting module takes the target transmission power as a current lowest allowable transmission power to transmit when the mobile device uses the communication mode in the area again.

6. The mobile device according to claim 5, wherein the communication mode includes a data transmission mode, a voice call mode or a standby mode corresponding to a communication standard.

7. The mobile device according to claim 6, wherein the establishing module obtains the transmission powers defined by the communication standard, initializes a count value corresponding to each of the transmission powers, and accumulates the count value of a first transmission power of the transmission powers when the mobile device uses the first transmission power.

\* \* \* \* \*